Nov. 17, 1970    K. S. CLARK    3,540,105
METHOD OF FORMING A SPHERICAL BEARING
Filed Sept. 9, 1968    2 Sheets-Sheet 1
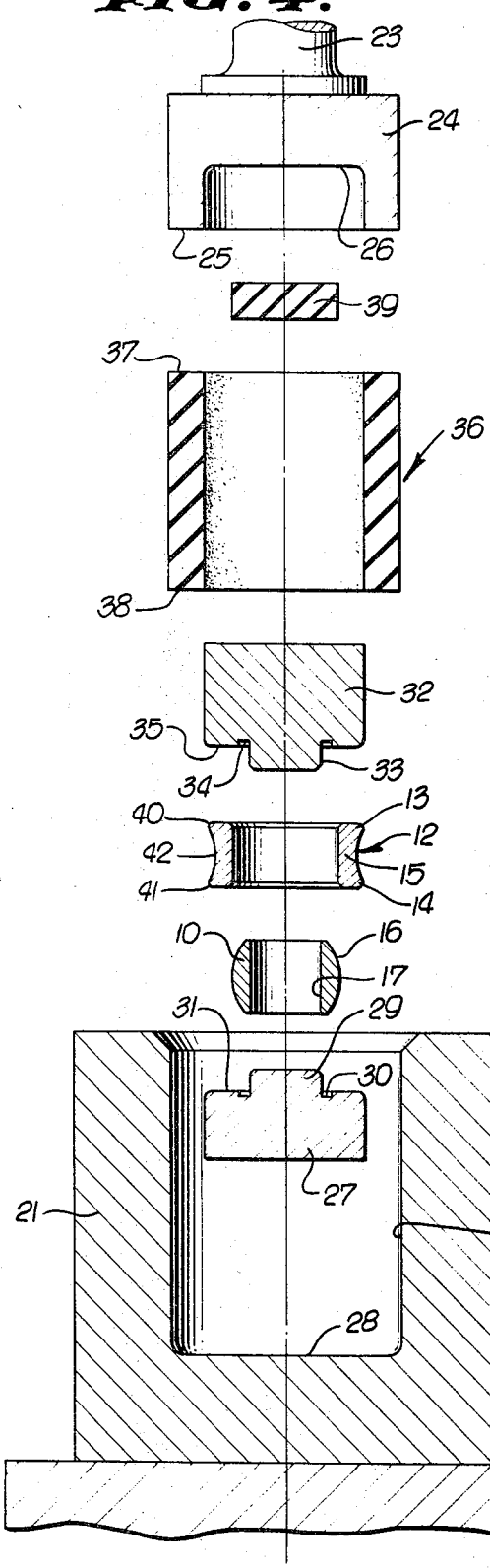
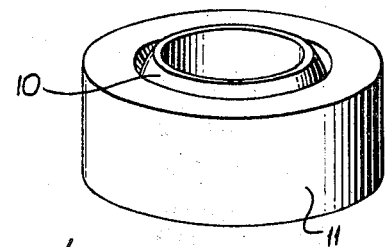
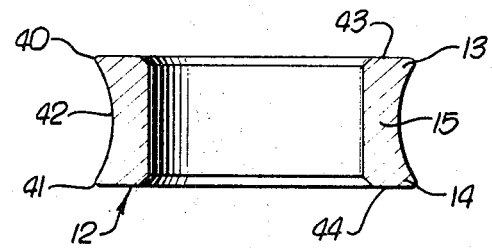
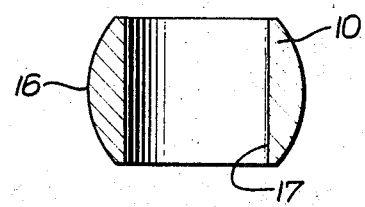
INVENTOR.
KENNETH S. CLARK
By
Miketta, Glenny, Poms & Smith
ATTORNEYS.

Nov. 17, 1970     K. S. CLARK     3,540,105
METHOD OF FORMING A SPHERICAL BEARING
Filed Sept. 9, 1968     2 Sheets-Sheet 2
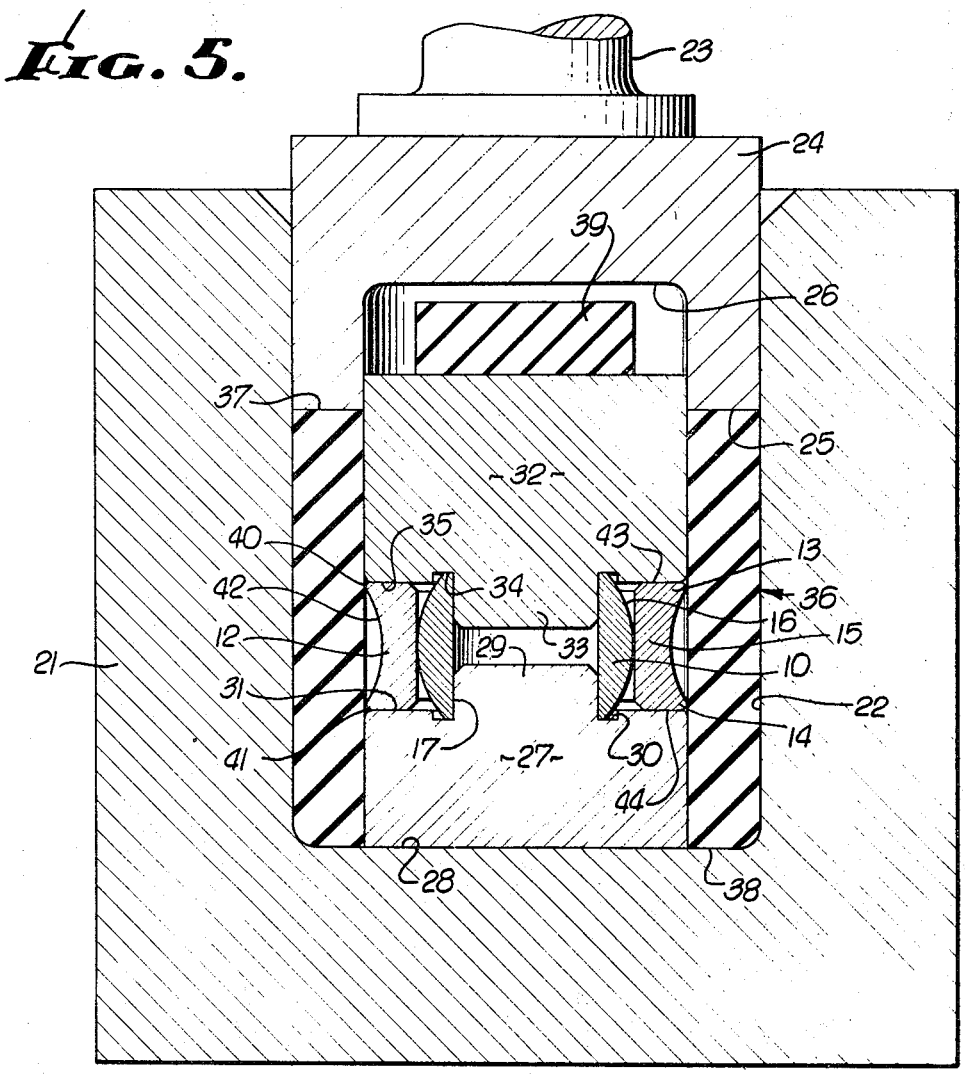
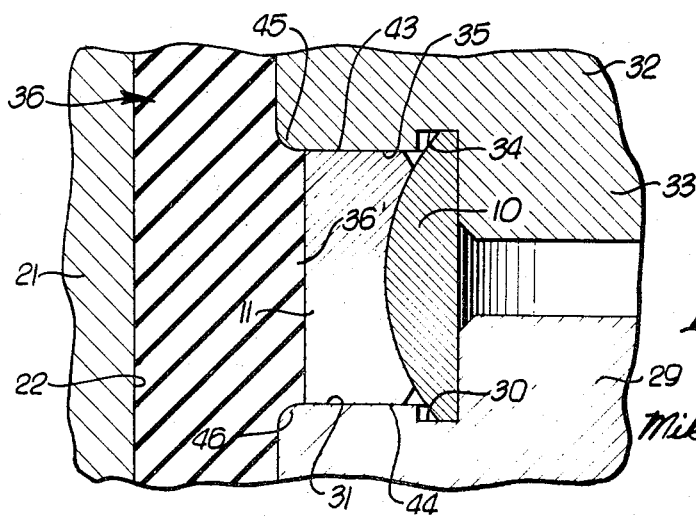
INVENTOR.
KENNETH S. CLARK
By
Miketta, Glenny, Poms & Smith
ATTORNEYS.

3,540,105
METHOD OF FORMING A SPHERICAL BEARING
Kenneth S. Clark, Sylmar, Calif., assignor to Kahr Bearing Corporation, Burbank, Calif., a corporation of California
Filed Sept. 9, 1968, Ser. No. 758,352
Int. Cl. B23p 11/00, 17/00
U.S. Cl. 29—149.5                     9 Claims

ABSTRACT OF THE DISCLOSURE

A two part spherical bearing, including an inner ball section bearing member and an outer race member, is formed or swaged into assembled relation through application of swaging or forming pressures to the race member about the inner ball section member through a rubber-like force transmitting sleeve positioned within a die cavity about the loosely assembled race and ball members upon first and second fixtures, the required forces being applied to the rubber-like force transmitting sleeve by ram means for compressing the sleeve within the die.

BACKGROUND OF THE INVENTION

Spherical bearings normally include a spherical-section ball or inner element about which a tubular race or outer bearing element is swaged. Normal swaging operations employed heretofore for forming spherical bearings include upper and lower die members which are brought together or closed about the assembled bearing members to surround and force the race member inwardly about the ball. Such method of swaging or forming the race member about an inner bearing member with a low friction material liner therein is disclosed in the prior Straub et al. Pat. No. 3,063,133. Said patent further discloses the use of an expansion pin within the inner ball section bore during the forming operation in order to provide bearing clearance between the inner ball member and race after the forming operation and after removal of the expansion pin from the ball section member.

An extrusion method of making spherical bearings is taught in the prior Board Pat. No. 2,995,813 wherein a race member or ring blank is positioned about a hardened ball-shaped or section member and the two members are forced axially into an extrusion die so as to compress the race ring blank around the ball member and place the inner concave surfaces of the race ring blank into bearing contact with the spherical surface of the ball.

It has therefore been common to employ metal swaging or extrusion die members for mechanically forming or swaging a race ring blank or preformed member about an inner ball section bearing member through metal to metal contact between the die members and race blank or preformed member. Considerable friction forces are thus created between the contacting metal surfaces, under the very high forming pressures required, which cause undesirable wearing and deterioration of the very expensive die members.

It is a primary object of the present invention to disclose and provide a method of forming a spherical bearing including an inner ball section bearing member and an outer race bearing member wherein metal to metal contact between a forming or swaging die and the outer race member of the bearing assembly is avoided during the forming operation and which is both economical and practical for mass production of spherical bearings.

It is a primary object of the present invention to disclose and provide a method of forming a spherical bearing including an inner ball section bearing member and an outer race bearing member wherein the forming or swaging forces applied to the race member of blank loosely assembled about an inner ball section bearing member are applied through a resilient pressure or force transmitting sleeve of rubber-like material positioned about the race and inner bearing members within a die cavity.

It is another object of the present invention to disclose and provide a method of forming a spherical bearing as in the foregoing object wherein the method includes the provision of a central bore through the ball section inner bearing member and the mounting of the inner ball section member and surrounding race member within the die cavity between fixture members provided to hold the inner and outer bearing members in position within the die cavity ready for the application of forming or swaging pressures through the force transmitting sleeve means.

It is a further object of the present invention to disclose and provide a method of forming spherical bearings as in the foregoing objects wherein the method includes the provision of low friction material facings on the fixture surfaces abutting the outer race bearing member during the forming operation, where the fixtures are provided to easily receive and mount the bearing members thereon and deterioration or cutting of the resilient force or pressure transmitting sleeve means is avoided to prolong its useful life in swaging or forming spherical bearings.

SUMMARY OF THE INVENTION

Generally stated, the method of forming a spherical bearing including an inner ball section bearing member and an outer race bearing member according to the present invention includes the steps of assembling a preformed outer spherical bearing race blank or member loosely about an inner ball section bearing member within the die cavity. A resilient pressure transmitting sleeve of rubber-like (preferably a silicon rubber) material is folded or curved into a sleeve-like configuration and inserted into the die cavity about the assembled bearing members within the die cavity. The forming or swaging of the race blank or outer member about the inner bearing member is accomplished through the application of forces upon an upper end of the pressure transmitting sleeve in directions generally parallel to the vertical axis of the sleeve and transmitting such forces to the outer surfaces of the race member through the compressible, force transmitting sleeve means.

More particularly, the method of forming a spherical bearing, according to the present invention, includes the provision of a central bore through an inner ball section bearing member and mounting such ball section member within a die cavity upon a first fixture provided in the die cavity with an upstanding circular boss portion of the fixture extending within the bore of the ball section bearing member. A preformed race blank or outer bearing member with thicker race sections in upper and lower marginal areas than at the race midsection is then assembled about the ball section, the race member being supported from beneath by the fixture upon which the ball section is mounted. A second fixture is then placed over the assembled race and ball section members with a downwardly depending circular boss portion thereof entering the ball section bore and a downwardly facing planar surface overlying and seating upon an upper surface of the race ring or member. This upper or second fixture is thus provided to hold the assembled race and ball members down upon the first fixture during the forming operation.

A flat sheet of resilient rubber-like material (preferably a silicon rubber) is bent or folded into a generally circular or sleeve-like configuration and inserted into the die about the assembled bearing members and fixtures. A ram means is then directed downwardly into the die compressing the resilient sleeve configured resilient rubber-like material into the die and against the outer surfaces of the race ring or member to form or swage it about the inwardly positioned ball member between the fixtures. The surfaces of the fixtures abutting or contacting the outer race member being forced inwardly about the inner ball section are preferably coated with a low friction material, such as a chromium plating. The inner ball section may be temporarily expanded during such forming operation by oversizing the fixture bosses or by providing an expansion pin within the ball section bore. It is further contemplated that a low friction material lining may be positioned between the ball section and outer race member, as in Straub et al. Pat. No. 3,063,133 during the forming operation to provide a low friction material lined spherical bearing.

A more complete understanding of the method of forming a spherical bearing in accordance with the present invention will be afforded to those skilled in the art from a consideration of the following more complete and detailed disclosure of an exemplary apparatus and method of forming a spherical bearing within the present invention. Further objects and various advantages of the present method of forming a spherical bearing will also be apparent to those skilled in the art. Throughout the following detailed explanation of the preferred exemplary embodiment of the method and apparatus of the present invention, reference will be made to the appended sheets of drawings in which:

FIG. 1 is a perspective view of an assembled spherical bearing including an inner ball section bearing member and an outer race bearing member made in accordance with the method of the present invention;

FIG. 2 is a section view of a preformed outer spherical bearing race member employed in the method of forming the spherical bearing of FIG. 1 in accordance with the present invention;

FIG. 3 is a section view of an inner ball section bearing member employed in making the spherical bearing of FIG. 1 in accordance with the method of the present invention;

FIG. 4 is an exploded view of exemplary apparatus for use in performing the method of forming a spherical bearing, as in FIG. 1, according to the method of the present invention;

FIG. 5 is a section view of the exemplary apparatus of FIG. 4 employed in forming the spherical bearing of FIG. 1 in accordance with the method of the present invention just prior to the step of forming the outer race member about the inner bearing member; and FIG. 6 is a detail view of the apparatus of FIG. 5 showing the exemplary race member formed about the inner bearing member in accordance with the method of the present invention.

A detailed explanation of the method of forming a spherical bearing, in accordance with the present invention, will now be made with reference to the drawings and the exemplary apparatus illustrated for performing the present method. Referring first to FIG. 1, the spherical bearing formed in accordance with the present invention comprises an inner ball section bearing member 10 and an outer race bearing member 11. The two-part spherical bearing illustrated in FIG. 1 may also be made with a low friction material liner of a tetrofluoroethylene material or as the dry or metal to metal contact bearing illustrated.

In accordance with the method of the present invention, the outer race member 11 is initially preformed as the preformed race 12 as seen in FIG. 2. Preformed race 12 is preformed to include thicker race sections in upper and lower marginal areas 13 and 14, respectively, than at the race midsection 15. The thicker race marginal sections 13 and 14 are provided so that these outer or upper and lower marginal areas may be pressed inwardly around the inner ball section to concurrently assemble the race about the ball and provide a relatively flat external surface for the race, as illustrated in FIG. 6 and as more fully explained hereinafter.

The inner race member is preformed as a ball section 10, as seen in FIG. 3, with a spherical or ball section surface 16 which forms the bearing surface between the bearing members 10 and 11. An inner bore 17 is provided through the inner bearing member 10 to facilitate mounting of the finished bearing on connecting rods and the like. The bearing surface 16 of the inner ball section bearing element 10 is preferably polished, the member being made of a suitable hardened metal. The preformed race member 12, on the other hand, is not hardened prior to the forming operation in order to allow requisite deforming of the race about the ball in accordance with the forming operation of the present invention as hereinafter explained.

Referring now to FIG. 4, a suitable base plate or support 20 is provided for mounting a die 21 having an inner generally circular cavity 22. Base plate or support 20 may be a portion of a suitable hydraulic ram press apparatus with means for pressing a ram member 23 downwardly into die cavity 22 with considerable force. A single ram means apparatus is illustrated with a ram cup 24 mounted thereon although it is contemplated that a double ram apparatus may be employed. The ram cup 24 is employed in the exemplary apparatus of FIG. 4 in order to provide a first annular configurated pressure surface 25 and a second inwardly spaced circular pressure surface 26 for applying forming and hold down forces to the apparatus provided within die cavity 22 as hereinafter explained. The ram or press apparatus should be capable of exerting forces on the order of at least 400,000 pounds in forming spherical bearings wherein the inner ball member has a one inch diameter bore.

In accordance with the method of the present invention, and referring to FIGS. 4 and 5, the preformed outer spherical bearing race member 12 is loosely assembled about the inner preformed ball section inner bearing member 10 within the circular die cavity 22. The first fixture or support member 27 is preferably placed within the die cavity 22 on the bottom surface 28 of die 21. First fixture member 27 is provided with an upstanding circular boss portion 29 over which the ball member 10 is placed as seen in FIG. 5, the upstanding boss portion 29 being received snugly within the bore 17 of inner ball member 10. Lower portions of ball section member 10 are received in an annular recess 30 formed about the upstanding boss portion 29 in the upwardly facing planar surface 31 of the first fixture. As seen in FIG. 5, the inner bearing member 10 is positioned about the circular boss 29 with lower portions thereof retained within circular recess 30 while the outer preformed race member 12 assembled loosely about inner ball member 10 is supported in such assembled relationship by the surrounding support or upwardly facing planar surface 31. While first fixture member 27 is shown as a separate part from the die 21 in the exemplary apparatus, such first fixture may be formed integrally with the bottom surface 28 of die 21. After the preformed race member 12 and ball member 10 are assembled on the first fixture 27 as seen in FIG. 5, a second or upper fixture 32 is placed in the die cavity 22 over the inner bearing member 10 and outer race member 12. A depending circular boss portion 33 of second fixture member 32 is inserted into the upper end of bore 17 of the inner ball member 10 with upper portions of the ball member being received in the annular recess 34 formed in the downwardly facing planar hold down surface 35. The second or upper fixture 32 is thus formed with a downwardly facing profile or section similar to the upwardly facing profile or section configuration of the first fixture 27. This second fixture 32 functions to hold the preformed race member 12 and inner ball member 10 in position within the die cavity during the forming operation as hereinafter explained.

As particularly contemplated within the method of forming a spherical bearing in accordance with the present invention, the heretofore conventional swaging methods of forming the race member about the inner ball member are not employed, but rather a pressure transmitting rubber-like sleeve, indicated generally at 36, is used in accordance with the present method. The pressure transmitting means indicated generally at 36 in the exemplary apparatus comprises a flat sheet of rubber or rubber-like material bent or curved into a generally round, sleeve-like configuration and which is inserted between the inner circular walls, forming the die cavity 22, and the exterior circular wall surfaces of the fixtures 27 and 32, as seen in FIG. 5. The material selected for the sleeve 36 must be capable of withstanding compressive forces over its exterior of at least 400,000 pounds, when positioned around the assembly of apparatus of FIG. 5, without breaking down. I have found that silicon rubbers available on the market, are satisfactory for use in making such pressure transmitting sleeve means. As seen in FIG. 5, the ram cup 24 is provided with a lower pressure transmitting or force applying annular surface 25 adapted to seat upon the upper annular end surface 37 of sleeve means 36. The lower or bottom end surface 38 of sleeve means 36 is adapted to seat upon the bottom surface 28 of die 21.

An additional hold down rubber pad 39 is provided in the exemplary apparatus to be engaged by the inner circular force transmitting surface 25 of ram cup 24 to hold the second or upper fixture member 32 down over the bearing race and inner ball member during the forming operation as hereinafter described. Rubber pad 39 may be made of the same material as sleeve 36 and is employed in order to facilitate the use of a single ram 23. Where a double ram apparatus is available, a first ram may be employed for holding the second fixture or retainer 32 down over the assembled preformed race member 12 and ball section 10 while a second ram apparatus forces an annular surface, such as surface 25 in the exemplary apparatus, down on the axial end of the sleeve means 36, as end 37 in the exemplary apparatus.

In accordance with the method of forming a spherical bearing according to the present invention, and referring now to FIGS. 5 and 6, the forming of the preformed race member 12 about the inner bearing member 10 is accomplished according to the present method by applying forces upon the end 37 of sleeve means 36 in directions generally parallel to the vertical central axis of sleeve 36. The forces thus generated in the sleeve means 36 are transmitted thereby to the exterior surfaces of the sleeve and in particular, against the exterior surfaces of preformed race member 12. In accordance with the method of the present invention, the preformed outer race member 12 of FIG. 5 is permanently deformed into the assembled and formed configuration of FIG. 6, wherein the thicker upper and lower marginal portions or areas 13 and 14 of the race member, have been forced inwardly into close proximity to the outer spherical section surface 16 of inner ball member 10. As seen in FIG. 2, the thickened portions 13 and 14 of preformed race member 12 may be provided with rounded or chamfered edges 40 and 41, where the outer curved surface 42 of the race member meets the upper and lower generally planar end surfaces 33 and 34 of race member 12. Such rounding of edges 40 and 41 reduces the likelihood of cutting or wearing of the rubber-like sleeve force transmitting means 36 in areas contacting such thickened portions.

The requisite bearing clearance between the race 11 and ball 10 may be obtained through conventional rolling methods, by use of an expansion pin within the bore of ball element 10 during the forming operation or by providing suitable low friction material liners between the ball and race during forming which tend to shrink and allow loosening of the race about the ball during curing thereof. Spherical bearings made in accordance with the present method may be thus of the non-lubricating low friction material lined type or of the more conventional oil lubricated bearings.

The preformed race member 12 may be preformed to have the thicker marginal portions 13 and 14 extend inwardly thereof rather than the straight walled bore illustrated. In any event, the marginal portions of the preformed race 12 are preferably thicker than the midportion 15 in order to provide the necessary material for deformation thereof about the ball as seen in FIG. 6. As is also readily seen in FIG. 6, the first and second fixture members are provided with rounded edge or corner portions 45 and 46 about which the rubber-like pressure transmitting material of sleeve 36 is forced during the forming method of the present invention. In completely forming race member 12 from the preformed configuration of FIG. 5 to the finished formed configuration of FIG. 6, midportions 36′ of the pressure transmitting means 36 are forced in between the first and second fixture surfaces 31 and 35, respectively, about the rounded corners 45 and 46. As explained hereinabove, the second fixture 32 is retained down upon the race and ball members of the bearing during the forming operation by the positioning of pad 39 between the upper surface of fixture 32 and the inner surface 26 of ram cup 24. As seen in FIG. 5, ram cup 24 is provided so that the force transmitting surface 25 thereof will force the force or pressure transmitting sleeve means 36 downwardly and inwardly about the race member 12 prior to the commencement of the hold down step effected when surface 26 lands on pad 39. After such initial application of a setting force upon sleeve means 36, further application of forces upon the ram cup 27, in the exemplary apparatus, cause both the forming of preformed race 12 about ball element 10 and the holding down of the second fixture 32.

Because of the high pressures encountered in forming the race 12 around ball 10, the planar opposed surfaces 31 and 35 of the fixtures 27 and 32 are preferably provided with a coating of a low friction material to reduce frictional forces exerted thereby on the upper and lower surfaces 43 and 44 of race 12. Such low friction material coating may comprise a coating of hard, polished chromium plating applied to such surfaces.

The foregoing explanation of exemplary apparatus for performing the method of making a spherical bearing is intended to be exemplary of the method of the present invention only. It should be understood by persons skilled in the art that other apparatus and mechanical means may be employed within the scope of the invention of the present method of forming spherical bearings which come within the spirit and scope of the present invention which is defined and limited only by the following claims.

I claim:

1. A method of forming a spherical bearing including an inner ball section bearing member and an outer race bearing member comprising the steps of:

assembling a preformed outer spherical bearing race member loosely about an inner ball section bearing member within a die cavity;

providing a pressure transmitting means for transmitting pressure applied on a first surface thereof to other surfaces thereof in a generally sleeve-like configuration about said race and inner bearing members within said die cavity; and forming said race member about said inner bearing member by applying forces upon an end of said pressure transmitting means in directions generally parallel to the vertical central axis of said pressure transmitting means and transmitting said forces to said outer race member through said pressure transmitting means to provide an assembled inner ball section and outer race member spherical bearing.

2. The method of forming a spherical bearing of claim 1 with the additional steps of:

providing a central bore through said ball section inner bearing member;

mounting said inner spherical bearing member wherein said die cavity on a first fixture provided in said die cavity with an upstanding circular boss portion of said first fixture extending upwardly within the bore of said inner bearing member; and placing a second fixture in said die cavity over said inner bearing member after said step of assembling said outer race member loosely about said inner bearing member with a depending circular boss portion of said second fixture extending downwardly into said bore of said inner bearing member prior to said step of forming said race member about said inner bearing member.

3. The method of forming a spherical bearing of claim 2 with the additional steps of:

supporting said outer bearing race member assembled about said inner bearing member by an upwardly facing planar surface on said first fixture extending about said fixture upstanding boss portion about which said inner bearing member is mounted;

providing a downwardly facing planar surface on said second fixture extending about said second fixture depending boss portion; and applying a holding force downwardly on said second fixture to maintain said outer race member captive between the opposed planar surfaces of said first and second fixtures during said step of forming said race member about said inner bearing member.

4. The method of forming a spherical bearing as in claim 3 with the additional step of:

providing a coating of low friction material on said upwardly and downwardly facing planar surfaces of said first and second fixtures to facilitate movement of adjacent marginal portions of said outer race bearing member inwardly about said inner bearing member during said step of forming said race member about said inner bearing member while said race member is held captive between said first and second fixtures.

5. The method of forming a spherical bearing as in claim 3 with the additional steps of:

forming an annular recess in the planar surface of each of said first and second fixtures adjacent and about said upstanding and depending boss portions; and inserting lower and upper portions of said bored inner bearing member into said recesses in said first and second fixtures, respectively, during said respective steps of mounting said inner bearing member on said first fixture and placing said second fixture in said die cavity over said inner bearing member.

6. The method of forming a spherical bearing as in claim 1 including the additional step of:

preforming said outer spherical bearing race member to provide thicker race sections in upper and lower marginal areas thereof than at the race mid-section; and deforming said thicker race portions inwardly about said inner ball section bearing member with a bearing clearance therebetween by said step of forming said race member about said inner bearing member.

7. The method of forming a spherical bearing by swaging an outer preformed race member about a ball section inner race member comprising the steps of:

placing a bored ball section inner spherical bearing member within a circular cavity of a die with said ball section positioned on a first fixture provided in said die and with a circular boss portion of said first fixture extending upwardly into the bore of said inner race member;

assembling a preformed outer spherical bearing race member about said inner race member within said die cavity;

placing a second fixture in said die cavity with a depending circular boss portion of said second fixture extending downwardly into said inner member bore, and positioning said outer race member between opposed planar surfaces of said fixtures;

providing a sleeve of resilient, rubber-like material around said fixtures and bearing members and within said die cavity; and forming said preformed outer race member about said inner bearing member by forcing a ram member down on said sleeve into said die cavity to apply forming pressures on the exterior of said outer race member in directions generally normal to its vertical central axes through said sleeve while maintaining said fixtures in stationary opposed relation.

8. The method of claim 7 with the additional step of:

providing a low friction material coating on said opposed planar surfaces of said fixtures to facilitate forming said outer race member about said inner race member.

9. The method of claim 7 with the additional step of:

providing a low friction material between said inner and outer race members prior to said forming step to facilitate their relative rotation after said forming step and removal from said die.

References Cited

UNITED STATES PATENTS

| | | | |
|---|---|---|---|
| 2,724,172 | 11/1955 | Potter | 29—149.5 |
| 2,952,899 | 9/1960 | Glavan | 29—148.4 |
| 3,191,265 | 6/1965 | McCloskey | 29—149.5 |

THOMAS H. EAGER, Primary Examiner

U.S. Cl. X.R.

29—421, 441